Patented July 7, 1925.

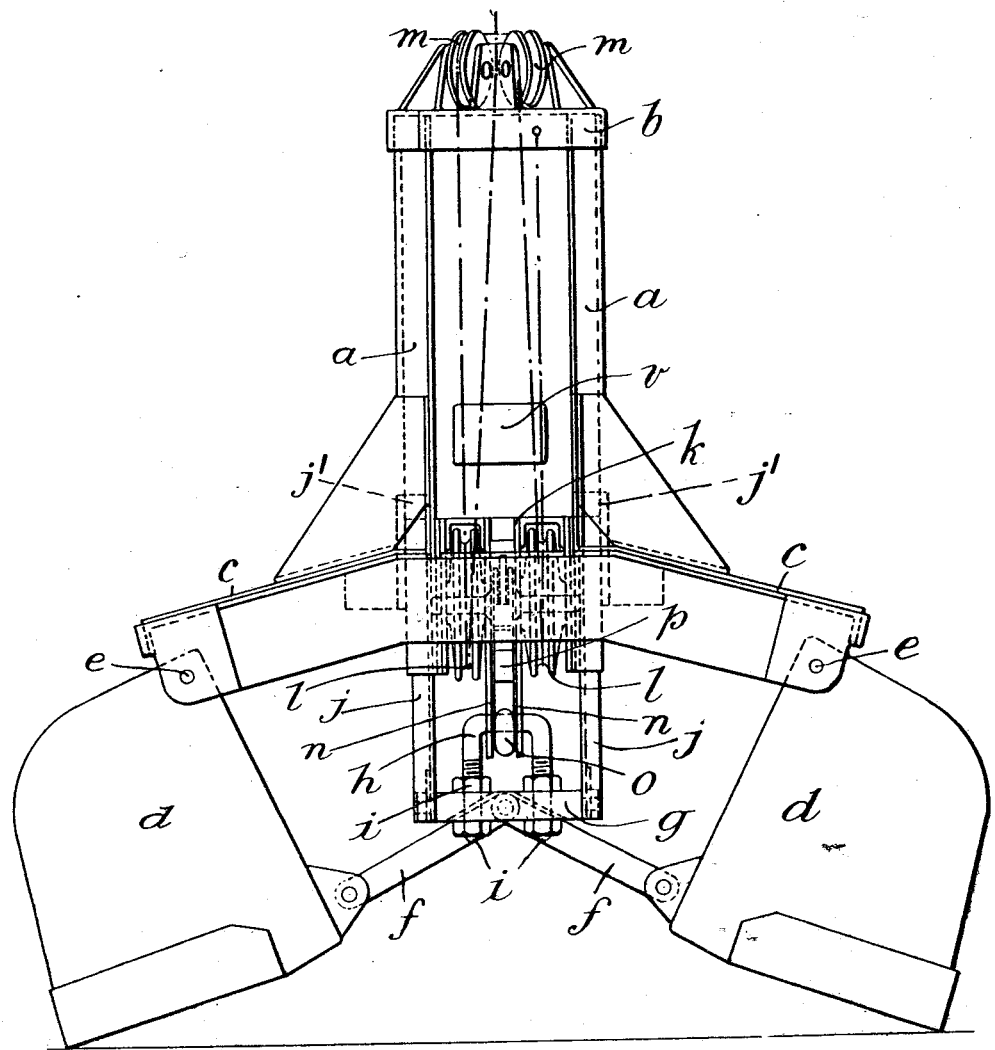

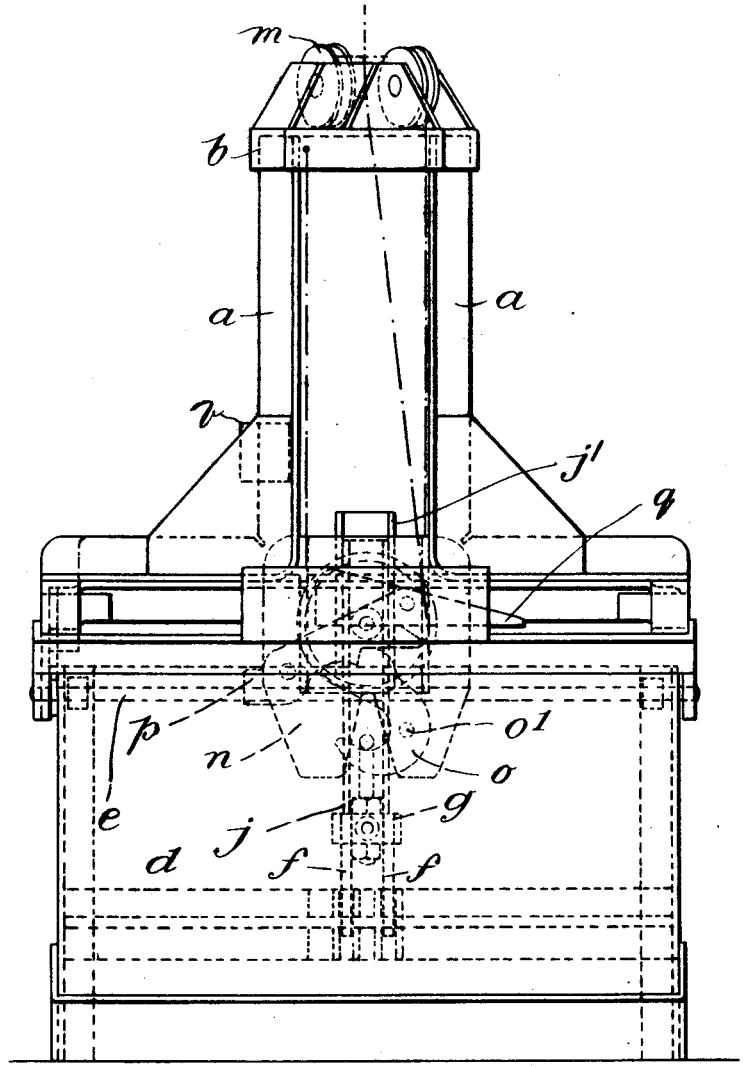

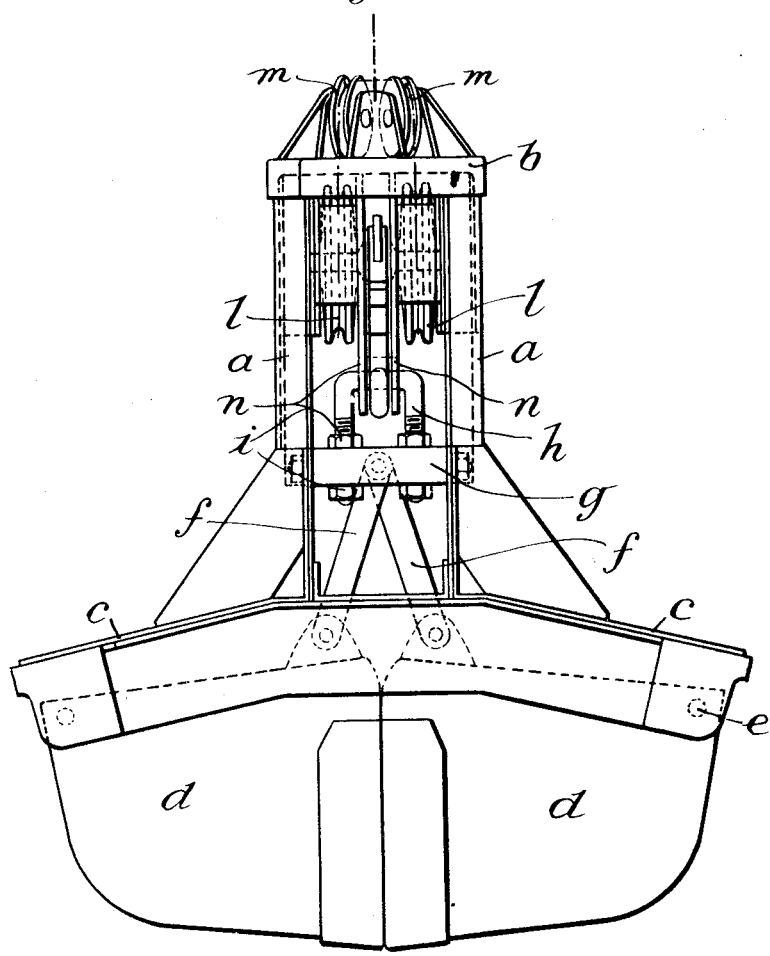

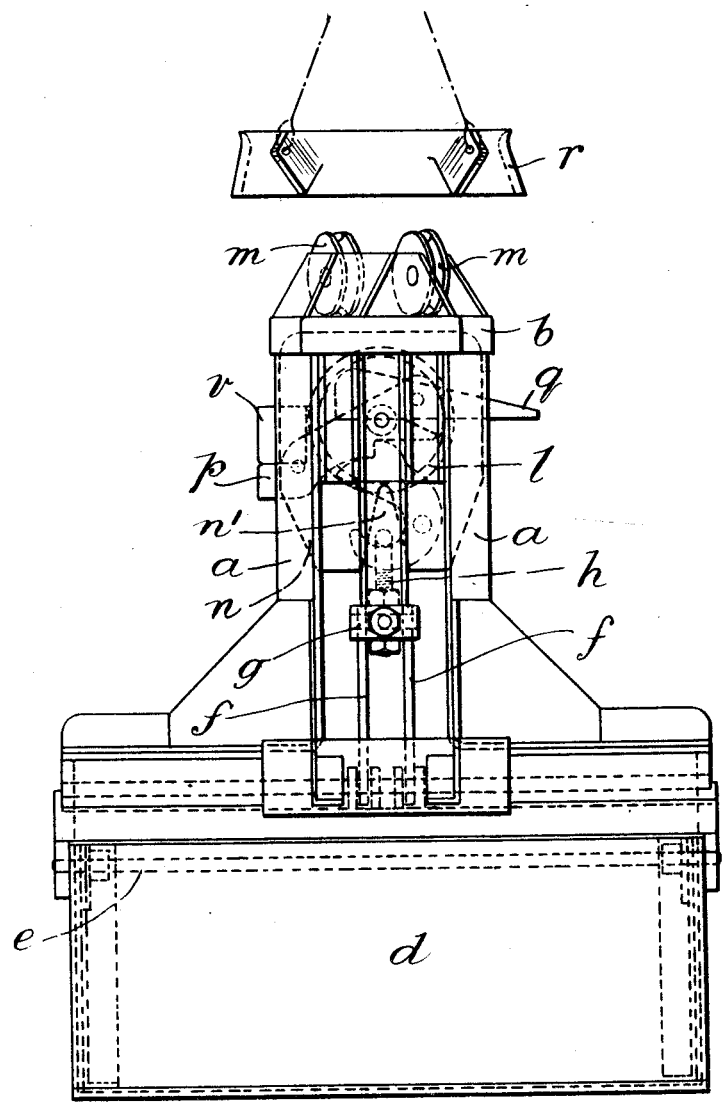

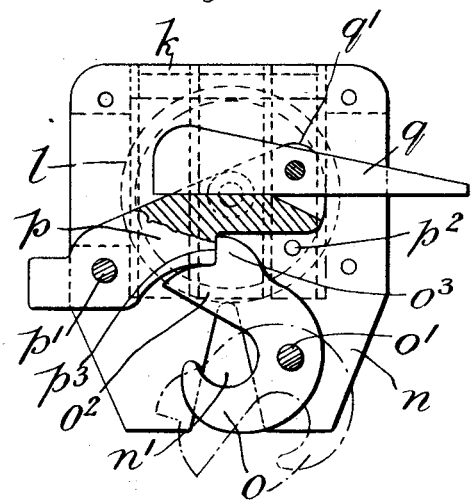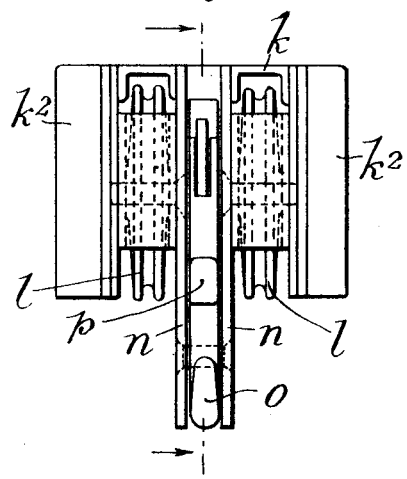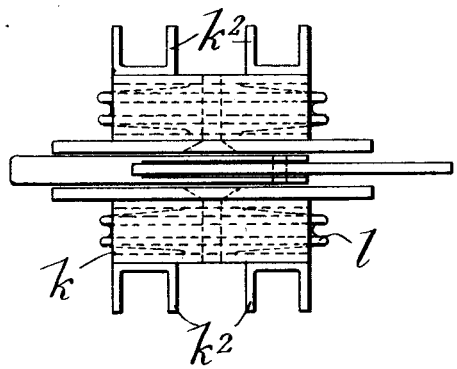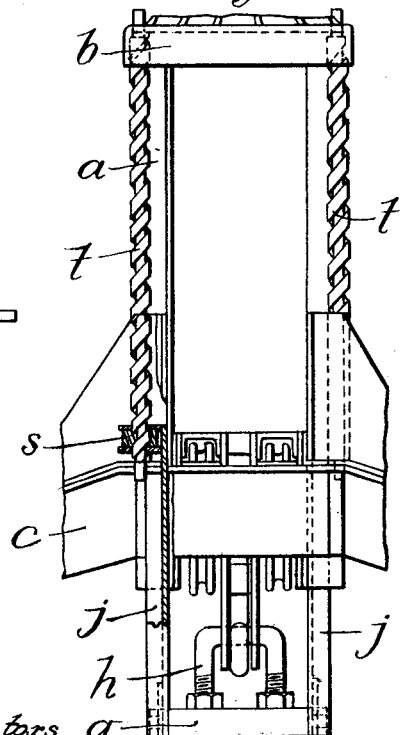

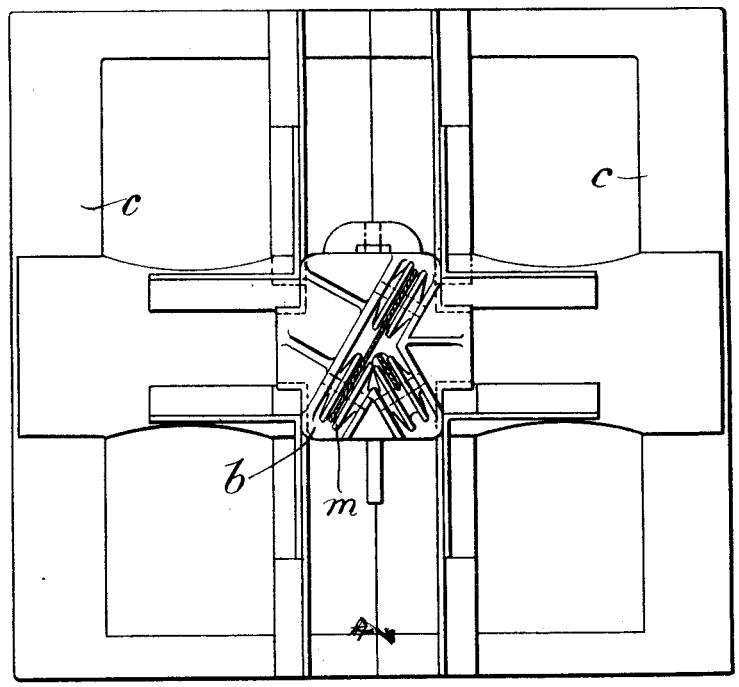
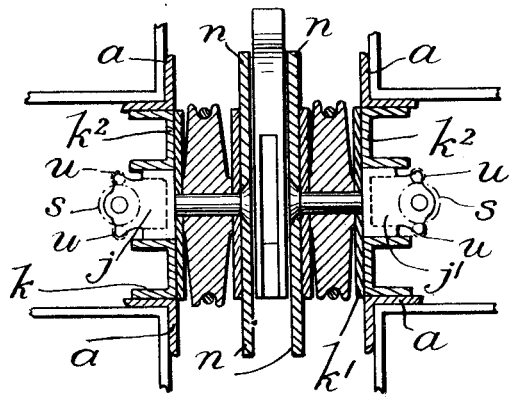

1,544,969

UNITED STATES PATENT OFFICE.

HERBERT McDONALD COOPER, OF ILFORD, AND HENRY BENJAMIN WILLMOTT, OF BARKING, ENGLAND.

LIFTING AND DUMPING OR RING-DISCHARGE GRAB.

Application filed September 9, 1921. Serial No. 499,453.

*To all whom it may concern:*

Be it known that HERBERT McDONALD COOPER and HENRY BENJAMIN WILLMOTT, subjects of the King of Great Britain and Ireland, and residents, respectively, of 73 Roman Road, Ilford, Essex, England, and of 98 Longbridge Road, Barking, Essex, England, whose post-office addresses are, respectively, 73 Roman Road, Ilford, Essex, England, and 98 Longbridge Road, Barking, Essex, England, have invented certain new and useful Improvements in Lifting and Dumping or Ring-Discharge Grabs, of which the following is a specification.

This invention relates to lifting and dumping or ring discharge grabs in which a bucket cross-head and a pulley or hook carrying cross-head are mounted to slide vertically in a guide frame, the hook carrying cross-head being connected with a crane by means of a chain or rope and the bucket cross-head being connected by links with the two bucket halves or jaws which are carried on axles or hinge pins mounted in lateral extensions on the lower part of the guide frame.

One object of the invention is to facilitate the engagement and disengagement of the hook with the bucket cross-head, another object is to enable the height of the guide frame and thus the total height of the grab to be reduced as compared with grabs of known construction, and a further object is to provide improved means for controlling or steadying the opening movement of the bucket halves or jaws.

According to this invention the hook is held in the engaged position by a catch lever arranged to engage the shank of the hook and carrying a pivoted releasing lever capable of being operated automatically when dumping by the usual suspended ring or cone, the arrangement being such that the releasing lever tilts freely but remains inoperative while passing upwards through the ring or cone and is actuated to release the hook retaining catch by subsequently lowering the grab during which lowering movement one end of the lever bears against the top of the ring and is raised thereby also raising the hook retaining catch and releasing the load. The hook swings into the uncoupled position when set free by the raising of the retaining catch and remains in that position until the grab is lowered for reloading, when the eye by entering the hook and bearing against the shank thereof, forces the same upwards into engagement with the retaining catch thus securing the hook in the coupling position. In the uncoupled position the mouth of the hook is directed downwards so that the eye can readily enter, the shank of the hook forming a guide to facilitate the passage of the eye into same.

When lifting loads that do not require to be automatically discharged by the ring or cone the catch lever can be arranged to be operated by a weight when the grab bucket is lowered on to dump to relieve the hook of the weight of the load and bucket.

The bucket cross head is mounted on extension bars or members adapted to slide vertically in relation to the guide frame to permit of the cross head which is carried on the lower ends of said extension bars, being lowered or extended some distance below the guide frame to open the bucket halves. said cross head with its extension members being drawn up into the guide frame by the pulley or hook-carrying cross head when the bucket is closed.

The extent to which the bucket cross head can be lowered is limited by stops on the upper ends of the extension members.

In the extended position of the bucket cross head the effective height of the grab is not increased as the cross head and its extending members occupy the space between the open bucket halves, thus the reduction in the total height of the grab made possible by this arrangement corresponds approximately to the distance the bucket cross head is capable of being lowered below the guide frame, as will be readily understood.

For controlling the opening movement of the bucket halves or jaws the movement of the bucket cross head is retarded by a nut or nuts working on a vertical Archimedean screw spindle or spindles mounted on the guide frame, and subjected to a braking action as for example by the pressure of adjustable spring washers applied to toothed wheels meshing with teeth on the nut or other means.

The invention is hereinafter described with reference to the accompanying drawings in which similar reference characters are employed to indicate similar parts throughout the different views.

Figs. 1 and 2 are elevations at right angles to each other of a grab constructed according to this invention. showing the bucket in the open position.

Figs. 3 and 4 are similar views to Figs. 1 and 2 showing the bucket closed.

Fig. 5 is a sectional elevation of the hook-carrying cross-head drawn on a larger scale.

Fig. 6 is an elevation of the cross-head at right angles to Fig. 5.

Fig. 7 is a plan of the cross-head.

Fig. 8 is an elevation of a portion of the grab partly in section and partly broken away illustrating a slightly modified form of construction.

Fig. 9 is a plan view of the grab as shown in Figs. 1 to 4 and

Fig. 10 is a horizontal transverse section of Fig. 8.

The guide frame of the grab is built up of bars and plates in any suitable manner, and comprises as shown four upright angle bars $a$ surmounted by and secured to a crown or head $b$ at their upper ends and joined at their lower ends to a transverse frame $c$ from which the bucket halves $d$ are pivotally suspended from axles or hinge pins $e$ fixed in the frame $c$.

Pairs of links $f$ directly connect the bucket halves to the bucket cross-head $g$ which carries the coupling eye $h$ consisting as shown of a U shaped member the legs of which are screw-threaded and passed through holes in the cross head $g$ being fixed by nuts $i$, which arrangement permits of adjustment of the eye to compensate for wear in the links $f$.

In order to enable the bucket cross-head $g$ to be extended below the guide frame, the cross-head $g$ is fixed between the lower ends of a pair of movable extension bars or members $j$ which slide in guides on opposite sides of the pulley cross-head $k$ between the cross head and the guide frame, the upper ends $j'$ of the bars $j$ being turned outwards or formed with heads which come against cross stays at the bottom of the guide frame to limit the downward movement of the bars $j$ and of the cross-head $g$ connected to them.

The cross-head $k$, which is clearly shown in Figs. 5, 6, 7 and 10, is arranged to slide vertically between the angle bars $a$ of the guide frame and is constructed of plates $k'$ and channel bars $k^2$ the flanges of which serve to guide the cross head in the frame and also form guides for the extension bars $j$.

Two sheaves or pulleys $l$ are shown mounted in the cross-head $k$ and the winding rope or chain which is fixed at one end to the crown $b$ passes down and under the sheaves $l$ in turn and over sheaves $m$ in the crown in known manner. It will be understood that the number and disposition of the sheaves may be varied according to requirements.

Fixed in the cross-head $k$ are two parallel plates or cheeks $n$ between which the hook $o$ is pivoted at $o'$ the cheeks $n$ each having a notch $n'$ at the lower end to admit the coupling eye $h$ of the cross head $g$. It will be seen that the pivot $o'$ of the hook is arranged in the head of same and so disposed that in the uncoupled position the shank or tail $o^2$ of the hook gravitates into a position across the path of the eye piece $h$, the mouth of the hook being inverted as shown in dotted lines Fig. 5. The catch or hook retaining lever $p$ Fig. 5 is pivoted near one end at $p'$ and in the disengaged position of the hook rests with its free end on a stop $p^2$ above the hook, the catch lever $p$ having a shoulder or projection $p^3$ on its underside arranged to engage a similar projection $o^3$ on the hook when the shank is raised by the entering eye $h$. On the catch lever $p$ is mounted the releasing lever $q$ which is pivoted to an upstanding lug or lugs $q'$ on the free end of the catch lever $p$. One arm of the releasing lever $q$ is made heavier than the other, and normally rests on the top of the catch lever while the other arm projects horizontally outside the cross-head and frame for engagement with the usual suspended ring or cone $r$, Fig. 4. During the upward movement of the frame, the releasing lever $q$ turns about its pivot on the lever $p$ as it passes through the ring, but does not actuate the said lever. On the descent however, owing to the disposition of the releasing lever $q$ on the top of the lever $p$, the releasing lever cannot turn independently of the lever $p$ when passing through the ring with the result that both levers are moved as one about the pivot of the lever $p$, raising the said lever out of its hook engaging position.

In some cases a dash pot may be fitted to steady or control the opening of the bucket or jaws when released by aid of the ring or cone.

Or with the same object as shown in Figs. 8 and 10, nuts $s$ are rotatably mounted in the heads of the extension bars $j$ of the bucket cross-head $g$ and work on fixed screw spindles $t$ of rapid pitch, the nuts being toothed and geared with pinions $u$ so that the nuts will be prevented from turning rapidly when moving along the screw spindles and the jaws thus prevented from opening too rapidly.

In Figs. 1, 2 and 4, there has been shown a weight $v$ which is slidably mounted and positioned to rest upon the heel end of the lever $p$. This weight is sufficient to tilt the lever to a releasing position when movement of the lever is unrestrained but when the shoulder $o^3$ of the hook $o$ is held tightly against the shoulder $p^3$ of the lever by the weight of the bucket hanging from the hook, the frictional grip of the shoulder $o^3$ against the shoulder $p^3$ will prevent the weight from swinging the lever to a releasing position. It will thus be seen that when the loaded bucket is lifted, the lever will be prevented from being moved to a releasing position but that as soon as the loaded bucket is lowered onto the dump and the hook thus relieved from the pull of the bucket and load, the weight may swing the lever to a releasing position and permit the jaws of the bucket to open. With this arrangement it is therefore not necessary to provide the ring $r$ for permitting opening of the bucket to drop the load.

We claim:—

1. In a grab comprising a bucket cross head and a hook carrying cross head mounted to slide vertically in a guide frame, means for coupling and uncoupling the cross heads, including a hook pivoted to turn mouth downwards when free, an eye on the bucket cross head adapted to enter the hook and turn it into the coupling position, and lever mechanism for retaining the hook in coupled position and releasing same, consisting of a pivoted catch lever arranged to engage the shank of the hook, and a releasing lever pivoted on the catch lever.

2. A grab according to claim 1, wherein the lever mechanism is capable of operation by a weight or ring for dumping or ring discharge, substantially as described.

3. A grab comprising a guide frame, extension bars capable of sliding vertically in relation to the guide frame and of being lowered or extended some distance below the same, a bucket cross head mounted on the extension bars, a hook carrying cross head mounted to slide vertically in the guide frame above the bucket cross head, a hook pivoted on the hook cross head and adapted to turn mouth downwards when free, parallel plates on the hook cross head adapted to support the hook and formed with guide notches, an eye on the bucket cross head arranged to enter the guide notches in the plate and to engage the hook and turn the same into the coupling position, and means for retaining the hook in the coupled position and releasing the same.

In testimony whereof they have affixed their signatures.

HERBERT McDONALD COOPER.
HENRY BENJAMIN WILLMOTT.